United States Patent [19]

Allezard

[11] Patent Number: 4,958,161
[45] Date of Patent: Sep. 18, 1990

[54] FREQUENCY-MODULATED CONTINUOUS-WAVE RADAR ALTIMETER SYSTEM

[75] Inventor: Roland Allezard, Verrieres le Buisson, France

[73] Assignee: U.S. Philips Corporation, New York, N.Y.

[21] Appl. No.: 374,516

[22] Filed: Jun. 29, 1989

[30] Foreign Application Priority Data

Jul. 1, 1988 [FR] France ................................ 88 08920

[51] Int. Cl.$^5$ ........................ G01S 13/34; G01S 13/36
[52] U.S. Cl. .................................... 342/122; 342/128; 342/120
[58] Field of Search .................. 342/122, 120, 128

[56] References Cited

U.S. PATENT DOCUMENTS

| | | | |
|---|---|---|---|
| 3,860,925 | 1/1975 | Darboven, Jr. .................... | 342/109 |
| 4,023,171 | 5/1977 | Stavis ................................ | 342/105 |
| 4,107,681 | 8/1978 | Robertson et al. ................ | 342/122 |
| 4,620,192 | 10/1986 | Collins .............................. | 342/128 |
| 4,739,330 | 4/1988 | Lazarus ............................. | 342/122 |
| 4,860,014 | 8/1989 | Shores et al. ..................... | 342/105 |

Primary Examiner—Thomas H. Tarcza
Assistant Examiner—John B. Sotomayor
Attorney, Agent, or Firm—Robert J. Kraus

[57] ABSTRACT

The radar system of the FM/CW type transmits a wave which has a virtually linear frequency, between two frequencies $f_1$ and $f_2$ and supplies a first beat signal ($Fb_1$) between transmitted and received waves; it is suitable for measuring the altitude h by measuring the overall phase rotation. According to the invention the radar supplies a second beat signal ($Fb_2$) in quadrature with the first signal; the signals $Fb_1$ and $Fb_2$ are digitized (23 to 26) and comparing means (36) compare the consecutive samples of $Fb_1$ and $Fb_2$, then calculating means (37) derive therefrom by means of successive increments/decrements the number of zero crossings of the phase plane in a predetermined direction minus the number of zero crossings in the opposite direction (result m). The calculated altitude h is proportional to m.

8 Claims, 3 Drawing Sheets

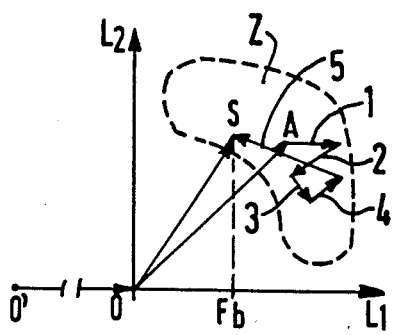
FIG.1
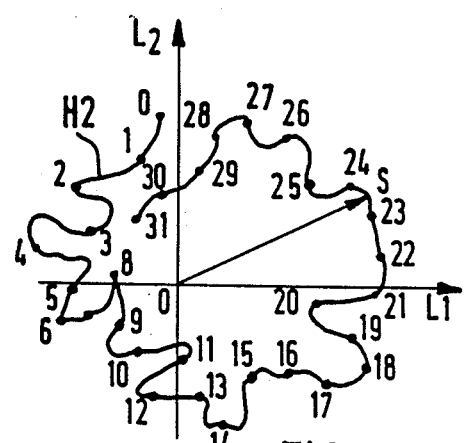
FIG.2
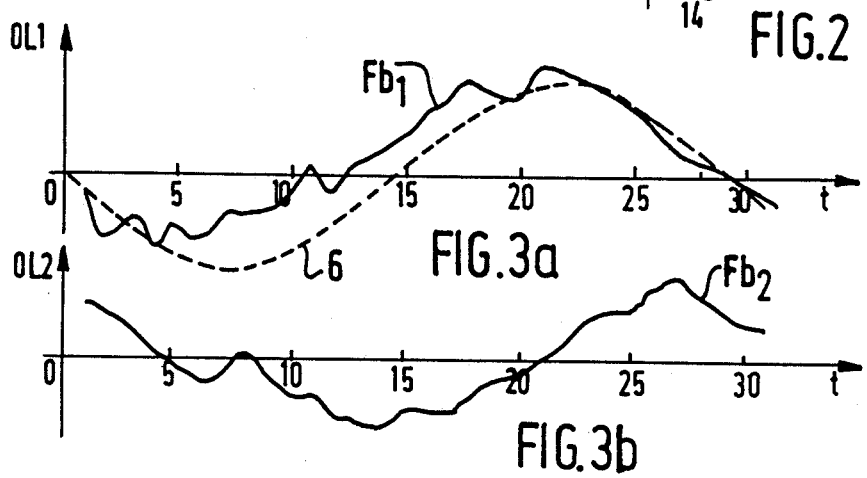
FIG.3a
FIG.3b
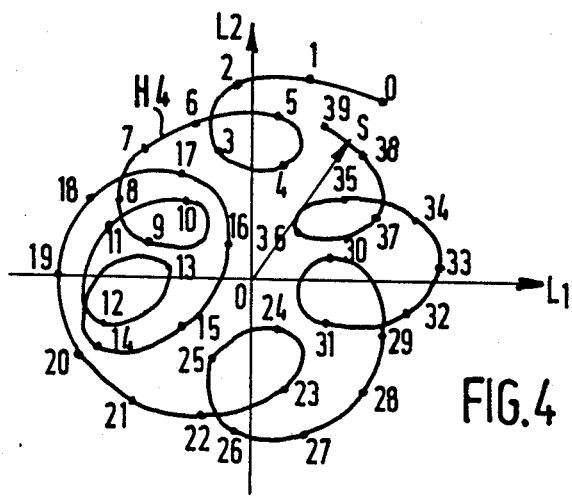
FIG.4

FREQUENCY-MODULATED CONTINUOUS-WAVE RADAR ALTIMETER SYSTEM

BACKGROUND OF THE INVENTION

The invention relates to a radar system of the frequency-modulated type, supplying to a transmit aerial a continuous wave whose frequency f varies almost linearly between a lower frequency $f_1$ and a higher frequency $f_2$ so that $f_2-f_1=\Delta f$, comprising a homodyne receiver linked to a receive aerial for supplying a first beat signal $Fb_1$ between transmitted waves and waves received after reflection, suitable for measuring altitude h by measuring the overall phase rotation (counting the number of axis crossings) of the said beat signal $Fb_1$ for the duration of $\Delta t$ of each sweep $\Delta f$ of the transmitted frequency.

When a radio altimeter is realised, intended to be installed aboard an aircraft, it is generally desired to measure altitudes over a very wide range and, possibly, running from zero altitude to an altitude upwards of 10,000 m. Currently two methods are frequently used for realising a radar altimeter. The first method consists of measuring directly the time of travel of a radio pulse or a pulse train encoded according to a code for example of the PN type. This type of equipment operates well at high altitudes but becomes critical when required for measuring very low altitudes as a result of the not insignificant width of the pulses and of the various swaying movements. The other method, which is used according to this invention, consists of measuring indirectly the time of travel by means of the beat frequency obtained from the correlation between a transmitted wave, linearly frequency modulated, and the signal received from the ground. This type of device called FM/CW, at least when it comprises two separate aerials, one for transmission and the other for reception, as is the case for this invention, is better adapted than the above pulse radar for measuring low altitudes but causes problems of insufficient precision and, above all, limitation when measuring high altitudes. In the latter case in fact, the echo signal received from the ground is very weak and in order that the beat signal can always be identified, the linearity in modulation of the transmitted signal should generally be very good and the phase jitter of the beat signal negligible. At high altitudes the FM/CW radar altimeter is limited from the moment when the phase jitter of the beat signal between transmission and reception caused by noise and other non-linearities is of the order of $2\pi$.

The echo signal received from the ground is the sum of a large number of independent echo signals but in which the phase near the foot of the straight line passing through the altimeter and having a perpendicular position relative to the ground dominates. This sum which fluctuates considerably and can be represented by a vector OS can resolve itself in the sum, in the phase plane, of a slowly fluctuating mean vector OA and a random sum of vectors moving over a range which, with respect to the modulus of the vector OA, for a given material is larger according as the altitude is larger. The main portion of the beat spectrum of the frequency-modulated altimeters is connected with the mean vector OA. Supposing an altimeter which, at the instant $t_1$ at which the transmitted frequency is $f_1$, is situated at a distance h from the mean point A corresponding with the main ground echo signal and which provides the above mean vector OA. The phase difference $\phi_1$ between the transmitted signal and the received signal can then be written as:

$$\phi 1 = 2\pi \frac{2h}{c} f_1 + \psi \quad (1)$$

with:
c: velocity of the electromagnetic wave
$\phi$: fixed angle depending on the altimeter circuitry.

Similarly, at an instant $t_2$ very near to $t_1$, for the frequency $f_2$, while the altitude h has not varied between the mutually adjacent instants $t_1$ and $t_2$:

$$\phi 2 = 2\pi \frac{2h}{c} f_2 + \psi \quad (2)$$

From the equations (1) and (2) the relationship of the frequency-modulated altimeters is derived:

$$\psi_2 - \psi_1 = 2\pi \frac{2h}{c} (f_2 - f_1)$$

or:

$$\Delta\psi = 4\pi \frac{h}{c} \Delta f$$

The equation (3) is better known in its derived form with respect to time:

$$fb = \frac{\Delta\phi}{\Delta t} \cdot \frac{1}{2\pi} = 2 \frac{h}{c} \frac{\Delta f}{\Delta t} \quad (4)$$

$$fb = 2 \frac{h}{c} \frac{\Delta f}{\Delta t}$$

where fb denotes the frequency of the above beat signal Fb.

The equation (3) can be directly used in zero-count altimeters as is the case for the present invention. The equation (3), assuming that $\Delta\phi=k\pi$ (k=integer) can in fact be written as:

$$h = k \frac{c}{4\Delta f} \quad (5)$$

Such altimeters of the FM/CW radar type are known specifically from the Radar Handbook, Skolnik, published in 1970 by McGraw-Hill, Chapter 16-18, specifically page 16-29. Let us assume that one of these conventional altimeters whose receive means effect only a single frequency change, that is to say, supply only a single beat signal $Fb_1$. This signal $Fb_1$ can be represented by the above vector OS (FIG. 1). If the local oscillation vector O'O, representing the abscissa axis in the phase plane, has an amplitude which is higher than that of the vector OS, the beat signal is thus practically the projection of the vector OS on the local oscillation vector O'O. The point A in the phase plane describes, in substance, a circle and the point S describes parasitic random undulations relative to this circle which undulations may or may not constitute loops. At the crossing of the coordinate axes of the phase plane these undulations may be represented by a plurality of zeros, at the crossing of each axis, instead of a single zero, more specifically, by a single or various pairs of additional parasitic zeros. This occurs when the beat signal is affected by considerable phase jitter. A zero-count FM/CW altimeter as indicated above would not differentiate parasitic pairs of zeros and would indicate too high a number of zeros, or too large a measured altitude, in accordance with equation (5). Alternatively, FM/CW radio altimeters are known operating with controlled beat frequency signals. In the latter case the frequency of the beat signal is maintained at a substantially constant value and the above parasitic random undulations are less distinct, that is to say, that this type of equipment is more resistant to jitter, but becomes ineffective in its turn if the phase errors become more important to the extent that this results in the systematic formation of loops concerning parasitic random undulations, in which case the equation (4), which is used for determining the altitude h, can no longer be used.

In all cases, between the instants $t_1$ and $t_2$ at which the frequencies are $f_1$ and $f_2$ respectively, whatever the frequency curve $f(t)$, the phases of the vector OS exist and do not depend on intermediate values.

SUMMARY OF THE INVENTION

It is an object of the invention to precisely measure the overall phase difference of the beat signal between the instants $t_1$ and $t_2$ for a modulation of the transmitted frequency, between the frequencies $f_1$ and $f_2$, which is only approximately linear.

It is a further object of the invention to be able to measure high altitudes, by means of an FM/CW radar system implementing overall phase rotation.

These objects are achieved and the prior-art drawbacks are remedied owing to the fact that the radar system set forth in the first paragraph is characterized in that it further includes receive means for producing a second beat signal $Fb_2$ shifted in phase by $\pi/2$ relative to the first signal $Fb_1$ as well as digitizing means for sampling the signals $Fb_1$ and $Fb_2$ at a rate $1/T$ of the order of several dozen times that of the signals $Fb_1$, $Fb_2$ and for converting the latter signals into digital signals $b_1(nT)$ and $b_2(nT)$ respectively, comparing means for comparing at each sample period T the signs of $b_1(nT)$, $b_1[(n-1)T]$, $b_2(nT)$, $b_2[(n-1)T]$ and calculating means for calculating increments on the basis of the said comparisons and deriving, by means of successive increments/decrements during the interval $\Delta t$, the number of times m, calculated algebraically, that the vector Fb of which $Fb_1$ and $Fb_2$ are the components on two perpendicular axes has travelled quarter turns in a given direction of rotation, whilst m is proportional to the altitude to be measured in accordance with the equation:

$$h = \frac{mc}{8(f_2 - f_1)} \tag{6}$$

The basic idea of the invention is to follow with sufficient precision the evolution of the vector OS in the phase plane so as to be able to determine the overall phase variation of this vector between two transmitted frequency values. Therefore, the quadrature beat signals $fb_1$ and $fb_2$ are sampled at a rate which is sufficiently high so that all the individual successive zero crossings of these signals are taken into account with for each zero the direction of rotation in which the coordinate axis is crossed corresponding with each zero, provided by the complementary indication of the sign of the quadrature beat signal which is not cancelled.

In this respect, a preferred embodiment of the invention is characterized in that the said comparing means associate the functions $B_1(nT)$ and $B_2(nT)$ with the signals $b_1(nT)$ and $b_2(nT)$ respectively, which function values are $+1$ or $-1$ according as the respective signals $b_1(nT)$ or $b_2(nT)$ are positive or negative, and in that at each sample period T the said calculating means perform the following calculations:

$$B_1(nT) \cdot B_1[(n-1)T] = C_1(n, n-1) \tag{7}$$

$$B_2(nT) \cdot B_2[(n-1)T] = C_2(n, n-1) \tag{8}$$

if $C_1 = -1$ then:

$$B_1(nT) \cdot B_2(nT) + m \rightarrow m \tag{9}$$

if $C_2 = -1$ then:

$$-B_1(nT) \cdot B_2(nT) + m \rightarrow m \tag{10}$$

In this manner, the above phase rotations of $+\pi/2$ and then $-\pi/2$ due to the parasitic random undulations of the vector OS cancel each other out and the overall phase rotation but for $\pi/2$, which can be qualified as suitable, is taken into account in its entirety.

BRIEF DESCRIPTION OF THE DRAWING

The following description with respect to the annexed drawing Figures, all this given by way of example, will make it better understood how the invention can be realised, in which:

FIG. 1 shows the echo signal in its vectorial form OS in the phase plane OL1, OL2.

FIG. 2 shows the evolution of the vector OS in time for a less distinct parasitic random undulation.

FIGS. 3a and 3b show, plotted against time, the projections of the vector OS of FIG. 2 on the axes OL1 and OL2 respectively.

FIG. 4 shows the evolution of the vector OS in time for a rather distinct parasitic random undulation.

DESCRIPTION OF THE PREFERRED EMBODIMENT

FIG. 1 shows, with interruptions, in O'O the local oscillation vector which symbolizes the transmit wave of an FM/CW radar altimeter. The vector O'O is fixed and merged with the axis of the abscissas of the phase plane OL1, the ordinate axis being OL2. In the plane OL1, OL2 the received ground echo signal is represented in the form of the vector OS generally small compared to O'O which is the sum of a slowly varying mean vector OA which one tries to identify and of a random sum of the vectors 1, 2, 3, 4, 5, which move in a zone S marked by a broken line for a given value of the time t, which is larger relative to the modulus of the vector OA with a higher altitude for a given material.

Figure 5A:
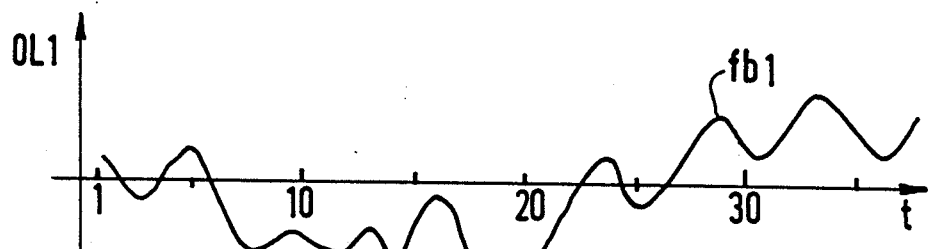
FIGS. 5a and 5b show, plotted against time, the projections of the vector OS of FIG. 4 on the axes OL1 and OL2 respectively.
Figure 5B:
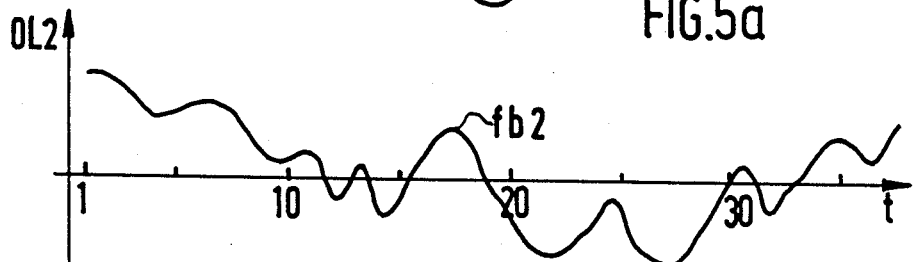

In FIG. 2 is shown the hodograph H2 of the vector OS for an FM/CW rado altimeter in which the transmitted frequency is in accordance with a pseudo-linear relationship, from instant $t_0$ (frequency $f_0$) to instant $t_{31}$ (frequency $f_{31}$), the successive instants $t_0$ to $t_{31}$ being represented by their single indices 0, 1, 2, . . . , 31. In absence of phase jitter, represented by the zone Z in FIG. 1, the curve H2 would be the one described by the point A, that is to say, in essence a circle having centre O (not shown). However, parasitic undulations occur which are less distinct in FIG. 2 in the way that no loops are formed for the curve 2. This means that there is a slight jitter, comparable to the vector AS (not shown), and that the chance of a multiplicity of zeros at the crossing of the axes OL1, OL2 is slim. In FIG. 2 two pairs of parasitic additional zeros will be noted, one at the crossing of the negative portion of the axis OL1 between the instants $t_4$ and $t_9$ and the other at the crossing of the negative portion of the axis OL2 between the instants $t_{10}$ and $t_{13}$ as is clearly visible in the FIGS. 3a and 3b in which the indices referencing the instants $t_0$ to $t_{31}$ are indicated by means of regularly spaced abscissas. It will be evident that even if there is a beat signal having little jitter as represented in the FIGS. 2 and 3a, 3b a conventional zero-count altimeter would indicate too many zeros and thus too large a distance h in accordance with the equation (5) stated above. By way of reference, the pure theoretical beat signal (not affected by noise) which is the projection of the vector OA on the axis OL1, is represented by the sinusoid in a broken line 6 in FIG. 3a. The FIGS. 4 and 5a, 5b show the case in which the phase errors are large and cause deeper waves, developing into the formation of the loops in the hodograph of FIG. 4. The loop formation implies that the amplitude of the noise vector AS becomes comparable to that of vector OA and that its frequency is higher, approximately ten times higher in the example of FIG. 4. Owing to the presence of loops pairs of false zeros occur. In FIG. 4 or in the FIGS. 5a and 5b 8 zeros are counted, at the crossing of the axis OL1, instead of the 2 zeros which normally are to measure a phase shift of $2\pi$ of the beat signal between the instants $t_0$ (frequency $f_0$) and $t_{39}$ (frequency $f_{39}$), when considering the crossing of the single axis OL1. In the prior-art zero-count altimeters only a single beat signal $Fb_1$ is used shown in the FIGS. 3a and 5a and when the zeros are counted, the procedure does not allow of identifying the parasitic zeros indicated above. In contradistinction therewith, the invention proposes to demodulate at the same time the echo signal with a quadrature oscillation OL2 which provides the signal shown in the FIGS. 3b and 5b leading to counting the zeros at the crossings of the two axes at a rate of 4 per turn in the plane OL1, OL2. In combination with the characteristic technique featured above, the calculations and the counting necessary for counting useful zeros are performed on the basis of digital values of the above quadrature beat signals $b_1$ and $b_2$, all this realising a correlation between the similar values in the intervals of $b_1$ and $b_2$. In order that all zeros are taken into account it is advisable to sample the values of the signals $b_1$ and $b_2$ at a rate which is sufficiently high and at least equal to twice the rotation frequency of the noise vector AS. In practice, as appears from the FIGS. 2 and 4, the sample rate is at least equal to thirty times the frequency of the beat signals $fb_1$ and $fb_2$. In the FIGS. 1 and 4 the references 1 to 31 and 1 to 39 respectively, may be considered sampling instants at instants which are multiples of T, that is T, 2T, ..., 31T and T, 2t, ..., 39T respectively.

Figure 6:
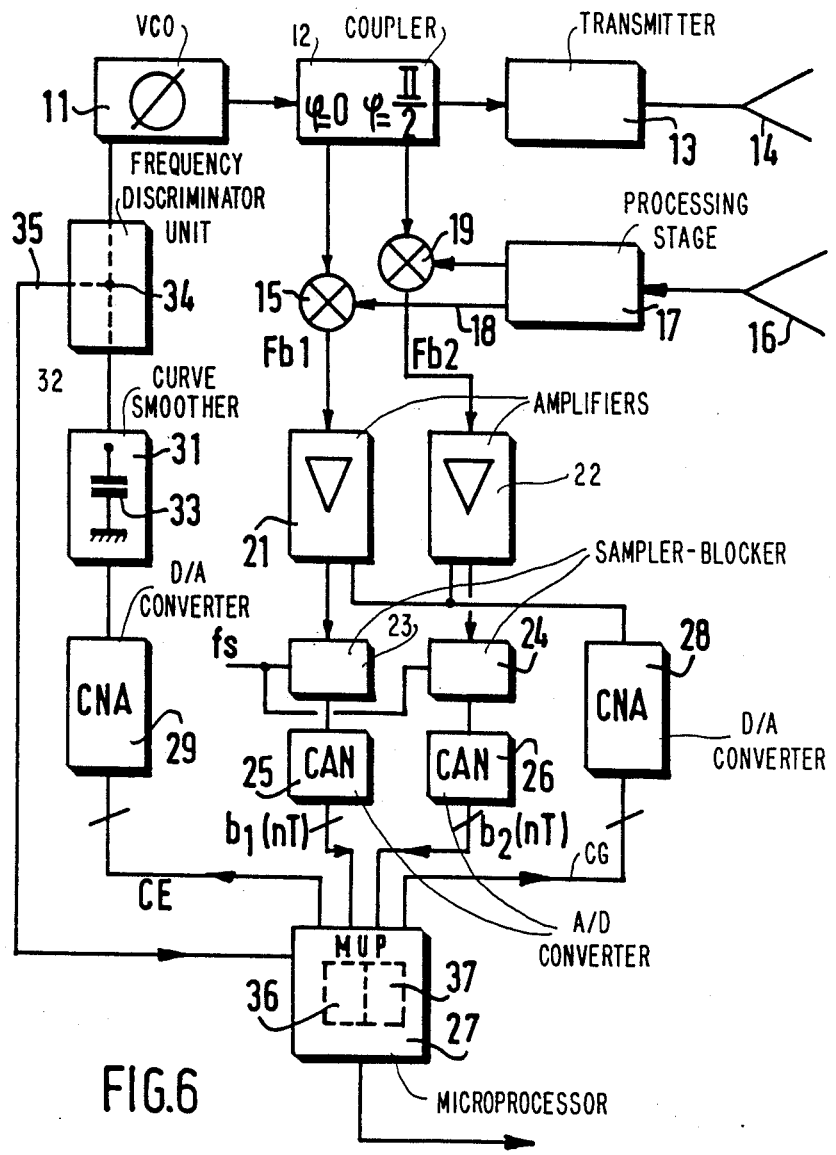
FIG. 6 is the block diagram of an embodiment of the radar altimeter system according to the invention.

A preferred embodiment of the radar system according to the invention is shown in FIG. 6. In a known fashion a voltage-controlled oscillator (VCO) 11 transmits a high-frequency signal which feeds, via a coupler 12, both the transmission power stage (transmitter) 13 connected to the transmit aerial 14 and a first mixer 15. The transmitter 13 is preferably connected to the transmit aerial 14 via an insulator (not shown) if the standing-wave ratio of the aerial 14 is too high and risks disturbing the system; this is also the case with the receive aerial 16, connected to a processing stage 17 which, according to the needs, can perform the triple function of high-frequency filter, suitable for altimeters in a hostile environment, power limiter, this limitation possibly being imposed, for example, by powerful and nearby radars, and high-frequency amplifier. The stage 17 has, in a known fashion, an output 18 connected to a second input of the mixer 15. According to the invention, the radar system of FIG. 6 comprises a second mixer 19 whose first input is connected to a second output of the coupler 12 and whose second input is connected to an output of the stage 17. The phase shifts between the input signals of the mixers 15 and 19 are provided and the electrical lengths of the conductors connected to these inputs adjusted such that the beat signals $Fb_1$ and $Fb_2$ at the output of the mixers 15 and 19 are shifted in phase by $\pi/2$. The $\pi/2$ phase shift is provided, for example, from a coupler 12 whose tapped local oscillation outputs send out transmission signals with a zero phase shift to mixer 15 and a $\pi/2$ phase shift to mixer 19 respectively, as is shown in the Figure. The same output signal or output signals from the stage 17, differing in phase as shown in FIG. 6, may be applied to the second inputs of the mixers 15 and 19. Each mixer 15, 19 is followed by a low-frequency amplifier 21, 22 whose passbands cover approximately one octave which is, for example, comprised between 50 and 100 kHz, and of which the high frequency is to be compatible with the sampling rate realised hereinbefore, that is to say, equal to a maximum of half the sampling rate $f_s$. The latter constraint is easy to remedy as far as there is a larger constraint with respect to the frequency $f_s$ already indicated above, according to which this sampling rate is equal to several dozen times the frequency fb. The amplifiers 21 and 22 which are virtually identical have a variable gain according to a relatively important dynamic range, of the order of 80 dB, as a function of the transmit power of the altimeter and comprise an automatic gain controller which can be used in common, as is shown, or separately. Each amplifier 21, 22 is connected to a sampler-blocker 23, 24 respectively, followed by an analog-to-digital converter (CAN) 25, 26 respectively, the four elements 23 to 26 constituting digitizing means. The CAN 25 and 26 have a dynamic range varying, for example, from +128 to −128, that is, 8 bits. However, it will be evident that for the altitude measurement according to the invention a dynamic range of plus or minus 1 is sufficient, which amounts to the limitation of knowing only the sign, as will be shown hereinafter. The CAN 25 and 26 are connected to a microprocessor (MUP) 27. The microprocessor supplies two digital signals over multiple conductors, a signal CG to a digital-to-analog converter (CNA) 28 and a signal CE to a digital-to-analog converter (CNA) 29. The signal CG, being converted into an analog signal in 28, automatically controls the gain of the amplifiers 21 and 22. The mean amplitude of the signals $b_1(nT)$ and $b_2(nT)$ at the output of the CAN 25 and 26 is compared to threshold values in the microprocessor 27 and, when this amplitude becomes too low or too high, a compensating correction is made in the gain of 21 and 22 by means of the signal CG, which constitutes a gain control loop of the amplifiers 21 and 22. Gain variations by means of leaps of 6 dB are advisable as is a 4-bit converter 28. For that matter, the digital signal CE controls the oscillator 11 via the series arrangement of CNA 29, a curve smoother 31 and a frequency discriminator unit 32. The output signal of the CNA 29 has the form of a step which is disadvantageous for correctly controlling the oscillator 11. In fact, in order to provide that measuring the altitude by counting the zeros has any sense, any discontinuity in the transmitted frequency which would achieve in its turn a discontinuity in the measurement of the phase of the beat signal, should be avoided. The curve reader 31 whose essential element is, for example, a capacitor 33 is to suppress in the first order the sudden variations of the output signal of the CNA 29 which would be comparable to discontinuities. On the other hand, it may be anticipated that if the passband of the amplifiers 21 and 22 is one octave wide, the frequency band of the altimeter signal which passes through may cause sudden variations of half an octave, these considerations being useful for the design of the CNA 29. If the oscillator 11 has an almost linear frequency as a function of the control voltage, then the dynamic range of the CNA 29 has to be equal to the dynamic range of the measured altitudes, including the residual lengths of the wires. Actually, the capacitor 33 creates an integration of the current and the beat frequency fb of the altimeter is the product of the slope of the frequency variation and the altitude except for a repetitive constant, as indicated by the above equation (4). If it is desired: for example, to measure altitudes ranging from 1 m to 10,000 m, the dynamic range of the CNA 29 will be approximately 27 bits if this converter is linear but only 5 bits if this digital-to-analog converter has an exponential characteristic value.

The unit 32 in FIG. 6 symbolizes means for detecting the instants $t_1$ and $t_2$ at which initial and final frequencies $f_1$ and $f_2$ respectively are transmitted by the oscillator 11, these frequency values determining entirely the value $\Delta\phi$ searched for and thus the measurement h by means of the above equation (3) which can also be written as:

$$h = \frac{\Delta\phi}{\Delta f} \times \frac{c}{4\pi} \quad (11)$$

The unit 32 can be reduced to a simple junction 34 if the voltage-controlled oscillator 11 is accurate; thus, it will suffice to locate the voltages $V_1$ and $V_2$ suitable for generating the frequencies $f_1$ and $f_2$ at the output of VCO 11, which is effected by a conductor 35 leading back to the microprocessor 27; this enables to determine, in the microprocessor 27, the instants $t_1$ and $t_2$ marking the beginning and the end of the zero counting. If more precision is desired or if the oscillator 11 is not sufficiently reliable, high-frequency resonators can be disposed of at the output of the VCO 11 according to a variant (not shown) which resonators are connected to the microprocessor 27 and directly show thereto the values of the transmitted frequency. It will be evident that for extreme accuracy a return line to the microprocessor 27 is not indispensable for determining instants $t_1$ and $t_2$; this return line would actually be useless if a VCO were used that could be readily manufactured and would be very reliable, for which the control-voltage values $V_1$ and $V_2$ whose send instants $t_1$ and $t_2$ originating from the microprocessor 27 are easy to determine would correspond to the frequencies $f_1$ and $f_2$. However, an oscillator having such qualities is expensive and, alternatively, a return of the transmitted signal to the microprocessor is always necessary for adjusting in a known manner the modulation slope of this signal at any instant as a function of the measured altitude in order to keep the frequencies of the beat signals $Fb_1$ and $Fb_2$ within the passbands of the amplifiers 21 and 22.

Preferably, the send sawtooth shows symmetrical triangles which, as a result of the mean value between the rising and falling slopes, permits to eliminate in a known fashion any Doppler effect. Thus, when the high frequency $f_2$ is attained, the voltage $V_2$ on the conductor 35 causes, in 27, the sign of the slope of the logic signal CE to be inverted so that this slope becomes negative. When the value $V_1$ is attained, in 34, this slope again becomes positive and so on.

The measurement of the altitude is effected in accordance with the above equation (3), taking into account the number of turns made by the vector OS in the plane OL1, OL2 whilst the frequency varies continuously from $f_1$ to $f_2$. According to the invention, the number of turns will be the result of the counting of one quarter of the number of times m that the point S will have passed through the positive semi-axis OL1, the positive semi-axis OL2, the negative semi-axis OL1 and the negative semi-axis OL2 by counting $+1$ in the direction of rotation and $-1$ in the opposite direction. Now we have the equation:

$$\Delta\phi = m \cdot \frac{\pi}{2}$$

The equation (3) can thus be written as:

$$h = \frac{m \cdot c}{8(f_2 - f_1)} \quad (6)$$

as already indicated hereinbefore, whilst the equation (6) resembles very much the more conventional equation (5) also indicated hereinbefore, according to which half turns are counted and not quarter turns.

In practice, the difference: $f_2 - f_1$, is of the order of 120 MHz and can be written as:

$$h = 0.3125 \text{ m in meters} \quad (13)$$

In order to identify the crossing of a semi-axis and the direction in which it is passed through, at each sample period T the signs of $b_1(nT)$, $b_1[(n-1)T]$, $b_2(nT)$, $b_2[(n-1)T]$ are compared, the storing and necessary correlations being effected in comparing means 36 inside the microprocessor 27. On the basis of preceding comparisons it is possible to calculate with calculating means 37 the number m by means of consecutive increments and decrements during the interval $t_2 - t_1$.

Preferably, the functions $B_1(nT)$ and $B_2(nT)$ whose respective values are $+1$ or $-1$ are associated to the signals $b_1(nT)$ and $b_2(nT)$ by comparing means according as the respective signals $b_1(nT)$ or $b_2(nT)$ are positive or negative, and at each sample period T the calculating means 37 perform the following calculations:

$$B_1(nT) \cdot B_1[(n-1)T] = C_1(n, n-1)$$

$$B_2(nT) \cdot B_2[(n-1)T] = C_2(n, n-1)$$

If $C_1 = -1$, the current value of m is incremented by the algebraic value: $B_1(nT) \cdot B_2(nT)$, which is written as:

$$B_1(nT) \cdot B_2(nT) + m \rightarrow m$$

If $C_2 = -1$, the current value of m is incremented by the value:

$$B_1(nT) \cdot B_2(nT), \text{ that is:}$$

$$-B_1(nT) \cdot B_2(nT) + m \rightarrow m$$

The most frequent case for the consecutive sample pairs $b_1$ and $b_2$ is: $C_1 = C_2 = +1$, which denotes the absence of zero crossing and yields an unchanged value for m. These calculations, comparisons and increments are performed by the microprocessor 27 between the instants $t_1$ and $t_2$, the value obtained at $t_2$ for the send frequency $f_2$ being the value to be taken into account for using the equation (6) or (13), the latter calculations being performed, for example, at each send sawtooth, by the microprocessor 27. For a symmetrical send sawtooth intended to avoid discontinuities of the send signal and enabling to eliminate the Doppler effect, the value of m to be introduced into the formula (6) or (13) is the mean value of the absolute values of m obtained for the positive and negative slopes.

Actually, the direction of rotation of the vector OS depends on the direction of modulation of the VCO 11. It is the same microprocessor 27 which performs the counting of the turns of the vector OS in the phase plane and which produces the control signal of the VCO, that is to say, the logic signal CE at the output of the microprocessor. Thus, preferably for avoiding electric shocks connected with a sudden return from $f_2$ to $f_1$ it is possible to effect a slow frequency drop from $f_2$ to $f_1$ with a discharging current identical to the charging current when inverting the signs of m.

In order that the signal processing and the calculations indicated above are performed correctly, it is necessary for the alternate beat signals $F_{b1}$ and $F_{b2}$ to pass through the low-frequency analog amplifiers 21 and 22. Preferably a sufficiently wide passband, one octave, is chosen in order not to be hindered by noise or Wobbler linearity. It is not advisable to go beyond that bandwidth because this would needlessly augment the noise in the useful signal. The mean frequency of the beat signal is:

$$fb = \frac{m}{4(t_2 - t_1)} \quad (14)$$

which equation can be reduced to the following equations stated hereinbefore:

$$\Delta\phi = m\frac{\pi}{2}$$

and:

$$fb = \frac{\Delta\phi}{(t_2 - t_1)} \cdot \frac{1}{2\pi}$$

The microprocessor 27 controls the slope of the VCO 11 in the following manner:

If the frequency fb, which can easily be calculated accurately at each sawtooth in 27, is higher than the central frequency fc of the amplifiers 21 and 22, the value of the charging current of the VCO 11 will be diminished on the basis of the signal CE with a preset ratio and inversely augmented in an analogous way if fb<fc. If an altimeter which has to control the altitude of a missile at a predetermined value, the slope may be fixed a priori, the range of measured altitudes being equal to the passband of the circuits 21 and 22, that is to say, when the passband of the circuits is equal to one octave:

maximum h = 2(minimum h)

In order to limit the dynamic range necessary for the CANs 25 and 26 and the risk of synchronization with false signals, the microprocessor controls via the CNA 28, in a search phase by means of signal CG, the maximum acceptable gain $G_M$ of the amplifiers 21 and 22 while using, for lack of other information, the relationship which combines the charging current i of the VCO 11 with other variables:

$$(AID + h) = \frac{K}{i} \quad (15)$$

where AID represents the residual length of the cables, the constants AID and K depend on altimeter aerials for the least reflective ground surface provided in the specifications and taking into account the fact that the gain $G_M$ searched for is to be proportional to $h^2$. Once an identifiable signal is present at the output of the amplifiers 21 and 22, the microprocessor 27 controls an identical gain over the two amplifiers 21 and 22 to such an extent that the strongest signal is of the order of half the capacity of the converters 25 and 26.

According to the invention the microprocessor 27 is preferably used for controlling the Wobbler slope of the transmitted signal; this permits to find the altitude much more rapidly than with the conventional method. In the prior art, a complete sequence of scannings is performed ranging from $f_1$ to $f_2$ with a current i decreasing at the ratio ½ at each new scanning until a counting frequency passing through the low-frequency amplifier 21 is identified. With the microprocessor 27 it is possible to examine whether the counting time is constant and, for example, equal to 3.6 ms, which corresponds to a counting value of m = 1000 in the middle of the low-frequency amplifier 21 assumed to have a frequency band comprised between 50 and 100 kHz. Every 3.6 ms the slope is divided at the ratio ½ and the m-counter is reset to zero. This procedure is continued until an identifiable signal is obtained. The dynamic range of finding the altitude, supposed to be 10,000, is thus verified approximately 1400 times faster than in the conventional way indicated hereinbefore and this verification does not take more than approximately 0.1 s.

Furthermore, the precision of determining the altitude which precision is attained according to the invention by continuously measuring the phase, as indicated hereinbefore, may be further improved by reducing the inaccuracy of the counting at the beginning and end of the mesurement m.

Assuming that an altimeter is desired having a precision of 0.3 m or 1°/00 (one per mille) whichever is the better of the two. The inaccuracy of the counting is more than 1 at the beginning and end of the measurement. To obtaiin a precision of 1°/00 for a measurement, m = 2000 has to be counted with. With the hypothesese of: $f_2 - f_1 = 120$ MHz, and fb = 70 kHz one obtains:

$$h = 2000 \times 0.3125 = 625 \text{ m}$$

and $$\Delta t = t_2 - t_1 = \frac{2000}{4 \times 70,000} = 0.00714 \text{ seconds}$$

If it is accepted to obtain the measurement of the altitude with a slight delay, for example 0.1 s, it will be evident that with the above hypothesese it is possible to perform 14 independent measurements during this delay, which enables to reduce the probable error from 1°/00 to 0.27°/00 when calculating the average value $m_m$ of these 14 measurements. At altitudes less than 625 m, the relative error value will be higher but the number of measurements will be higher and thus the precision linked with the measuring method will be better.

Alternatively, if one wishes to measure high altitudes, of the order of 10,000 m, it is advisable, in view of the Wobbler effect, to choose a high frequency $f_3$ which is clearly less high than the frequency $f_2$ which leads to the value: $f_2-f_1=\Delta f=120$ MHz indicated hereinbefore. In fact, the calculations in the microprocessor are limited to a certain number of bits, for example 12 bits. The maximum count itself is thus limited to 4096 and the value of $\Delta f$ which is derived directly from the above formula (6) is obtained by giving to m and h their maximum values:

$$\Delta f = f_3 - f_1 = \frac{mc}{8h} = 15,36 \text{ MHz}$$

A height of 2.44 m corresponds with m being incremented by 1. Thus, a first range of altitudes comprised between 0 m and 1280 m can be measured with a value $\Delta F = f_2 - f_1 = 120$ MHz and then a second range of altitudes comprised between 1280 m and 10,000 m with a value $\Delta F = f_3 - f_1 = 15.36$ MHz. For these measurements of the altitude the least precision is obtained at the moment of switching, towards 1281 m; the count m is then 525 and in a period of time of 0.002 s, that is 54 independent samples in 0.1 s, the probable error of 2/525 will thus be divided by: 54=7.3 and brought back to approximately 0.52°/00, which is acceptable. Thus, the task of the microprocessor may be simplified by choosing intermediate frequency sampling, such as $f_3$, for high altitudes.

For certain types of ground surfaces the amplitude of the received echo signal is modulated considerably or absent at times for longer or shorter intervals. An echo signal may repeatedly disappear specifically when hovering over a stretch of water. According to a variant, the microprocessor 27 controls at any time the sum of the absolute amplitudes of the two signals $b_1(nT)$ and $b_2(nT)$, such that:

$$|b_1(nT)| + |b_2(nT)|.$$

Once this sum is lower than a level S considered to be the minimum acceptable level as a function of the used material, this minimum being higher than the noise of the amplifier 21, the microprocessor stops enhancing m and evaluates the percentage of the clock time during which this or these stops will take place between $f_1$ and $f_2$.

If this percentage is high, higher than 10% for example, the microprocessor will cancel this measurement.

If this percentage is low, less than 10% for example, but repetitive with all these measurements, the microprocessor will calculate the value of h by means of extrapolation and assume that, during the periods in which there is no echo signal, m has varied, for example, linearly as a function of time or according to quite a different predetermined relationship.

Finally, if the percentage is high and repetitive, the microprocessor may release an alarm signal while continuing to supply a rather accurate estimation of the altitude.

Figure 7:
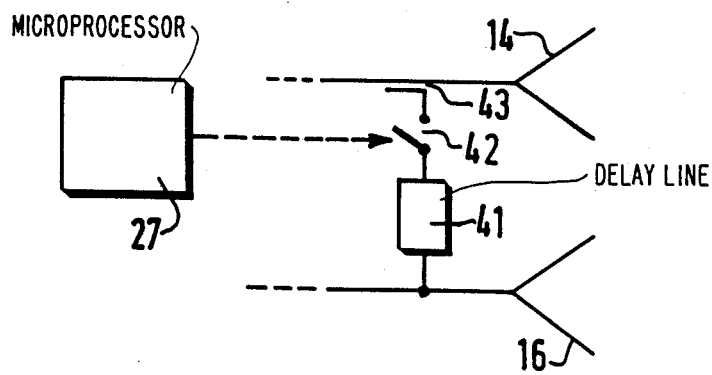
FIG. 7 shows the arrangement of a delay line on the radar of FIG. 6.

When reverting to the precision of the radio altimeter it will be evident that the latter depends mainly on the estimation of the frequencies $f_1$, $f_2$ and $f_3$. In order to eliminate the inaccuracy of these variations which may affect the values $f_1$, $f_2$ and $f_3$, according to a variant of the invention the radio altimeter may be provided with an internal delay line as represented in FIG. 7. The delay line 41 is connected with one end to the conductor of the receive aerial 16 and the other end to the conductor of the transmit aerial 14 by connecting an interruptor 42 and a coupler 43 in series. The closing of the switch 42 is commanded cyclically by the processor 27, for example, at a rate of once per second. It is assumed that the values of $f_1$, $f_2$ and $f_3$ are given as approximate but repetitive short range values by voltage thresholds at the input of the oscillator 11. Let $h_o$ be the known and stable value of the delay line referenced 41, then, as a result of the formula (12), the following can be written:

$$h_0 = \frac{m_0 c}{8 \Delta f} \tag{16}$$

and when combining the formulas (6) and (16):

$$h = \frac{m}{m_0} h_0$$

Consequently, there remains to be obtained the value $m_o$ with sufficient precision. It may happen that the length $h_o$ of the delay line 41 is not sufficient for the error in $m_o$ to be negligible. In that case, $m_o$ may be given a non-integer value formed by the counted integer main portion and the estimate in time, reduced to fractions of $\pi/2$, of the voltage switch position $f_1$ or $f_2$ relative to the counts $m_o$ immediately before and immediately after the voltage switch. This operation is possible with the signal of the delay line because it is accurate and does not fluctuate. Since the value $m_o$ is virtually known, any difference which is too large relative to this value is to activate an indicator which signals that the altimeter does not function properly.

I claim:

1. A radar system of the frequency-modulated type, supplying to a transmit aerial a continuous wave whose frequency f varies almost linearly between a lower frequency $f_1$ and a higher frequency $f_2$ so that $f_2 - f_1 = \Delta f$, comprising a homodyne receiver linked to a receive aerial for supplying a first beat signal $fb_1$ between transmitted waves and waves received after reflection, suitable for measuring altitude h by measuring the overall phase rotation of the said beat signal $Fb_1$ for the duration of $\Delta t$ of each sweep $\Delta f$ of the transmitted frequency, characterized in that it further includes receive means for producing a second beat signal $Fb_2$ shifted in phase by $\pi/2$ relative to the first signal $Fb_1$ as well as digitizing means for sampling the signals $Fb_1$ and $Fb_2$ at a rate 1/T of the order of several dozen times that of the signals $Fb_1$, $Fb_2$ and for converting the latter signals into digital signals $b_1(nT)$ and $b_2(nT)$ respectively, comparing means for comparing at each sample period T the signs of $b_1(nT)$, $b_1[(n-1)T]$, $b_2(nT)$, $b_2[(n-1)T]$ and calculating means for calculating increments on the basis of the said comparisons and deriving, by means of successive increments/decrements during the period $\Delta t$, the number of times m, calculated algebraically, that the vector Fb of which $Fb_1$ and $Fb_2$ are the components on two perpendicular axes has travelled quarter turns in a given direction of rotation, whilst m is proportional to the altitude to be measured in accordance with the equation:

$$h = \frac{mc}{8(f_2 - f_1)}$$

2. A radar system suitable for measuring the altitude as claimed in claim 1, characterized in that the said comparing means associate the functions $B_1(nT)$ and $B_2(nT)$ with the signals $b_1(nT)$ and $b_2(nT)$ respectively, whose function values are $+1$ or $-1$ according as the respective signals $b_1(nT)$ or $b_2(nT)$ are positive or negative, and in that at each sample period T the said calculating means perform the following calculations:

$$B_1(nT) \cdot B_1[(n-1)T] = C_1(n, n-1)$$

$$B_2(nT) \cdot B_2[(n-1)T] = C_2(n, n-1)$$

if $C_1 = -1$, then:

$$B_1(nT) \cdot B_2(nT) + m \rightarrow m$$

if $C_2 = -1$, then:

$$-B_1(nT) \cdot B_2(nT) + m \rightarrow m$$

3. A radar altimeter system as claimed in claim 1 or 2, characterized in that the said comparing means and the said calculating means form an integrated portion of a microprocessor.

4. A radar altimeter system as claimed in claim 3, characterized in that the said calculating means are suitable for calculating a non-integer value m by calculating the mean value $m_m$ of various consecutive measured integer values m.

5. A radar altimeter system as claimed in claim 3, characterized in that for measuring the altitudes belonging to the range of the highest altitudes, a third frequency $f_3$ of the transmitted signal is taken as the highest frequency by the microprocessor, whilst the value $f_3$ is comprised between $f_1$ and $f_2$.

6. A radar altimeter system as claimed in claim 3, characterized in that the said calculating means are suitable for controlling the sum:

$$|b_1(nT)| + |b_2(nT)|$$

at any time and, when this sum is smaller than a threshold S during the measurement of m, for evaluating the percentage of the clock period during which this threshold S is crossed in downward direction between the transmitted frequencies $f_1$ and $f_2$ ($f_3$ respectively) and for deriving therefrom either the cancellation of the measurement of m or an approximate value of m.

7. A radar altimeter system as claimed in claim 3, characterized in that it further includes an internal delay line of equal length $h_o$ which is periodically switched from the microprocessor and for which the counting of the zeros $m_o$ concerned is carried out periodically, the altitude h being calculated by calculating means in accordance with the equation:

$$h = \frac{m}{m_0} h_0$$

8. A radar altimeter system as claimed in claim 2, characterized in that the frequency modulation is increased and subsequently decreased for showing and measuring or cancelling the error caused by any Doppler effect.

* * * * *